2,586,932

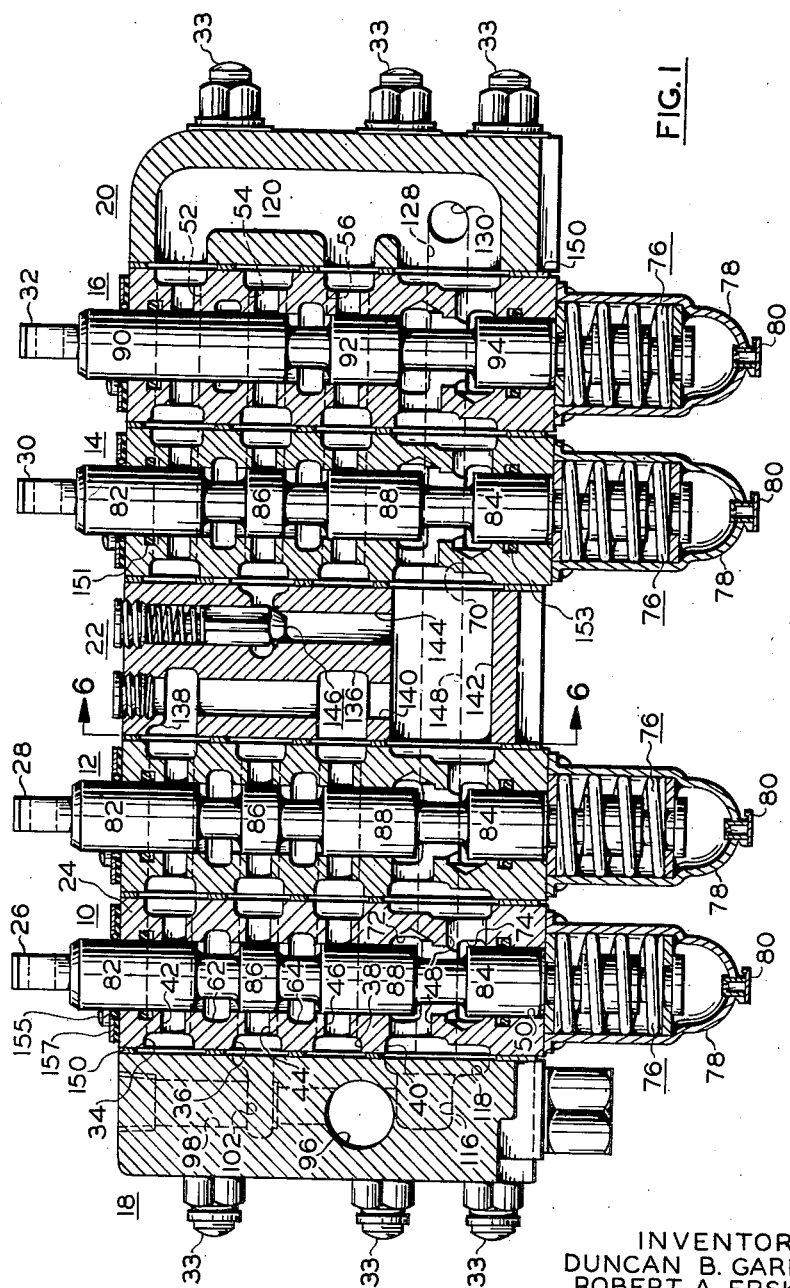

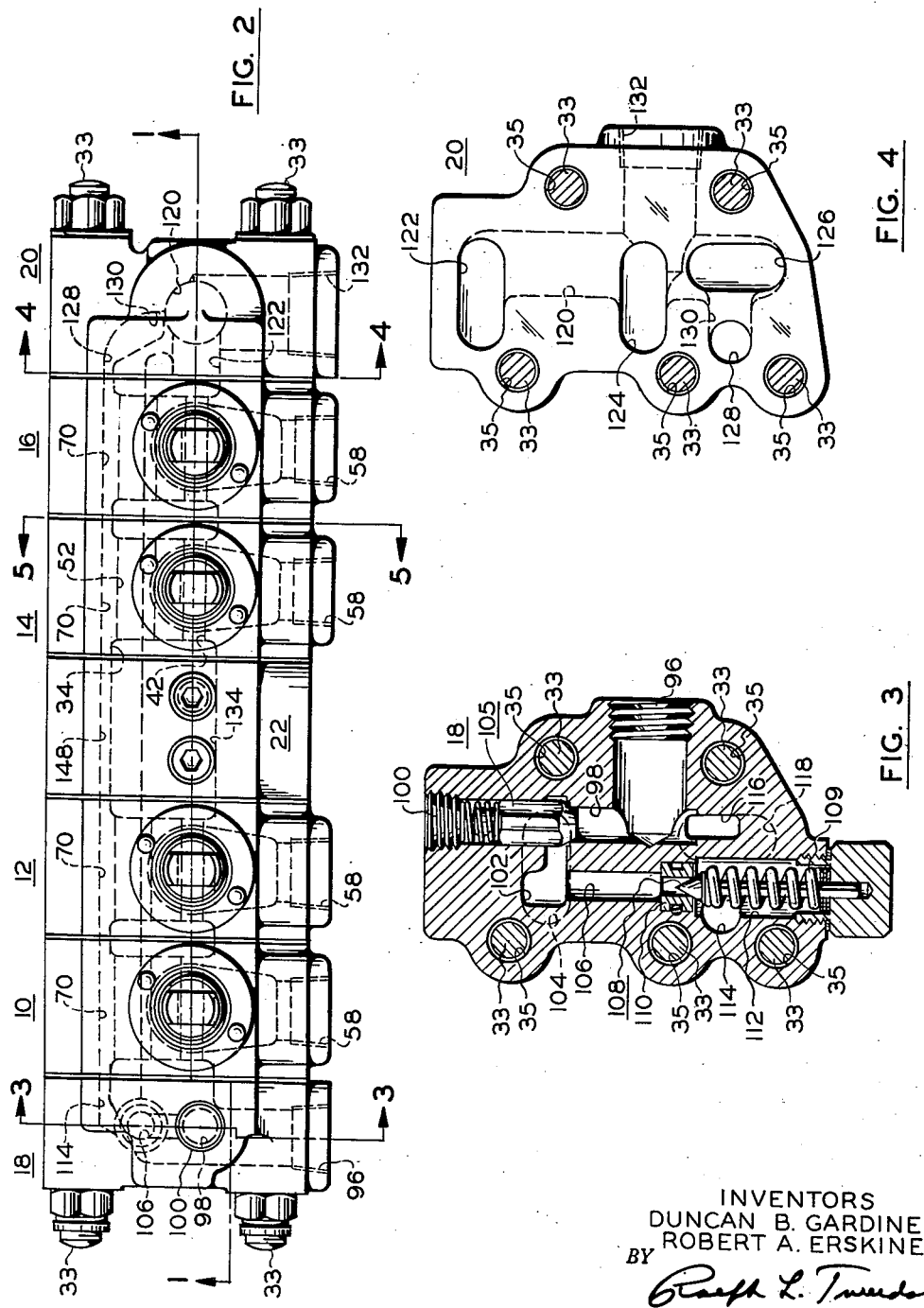

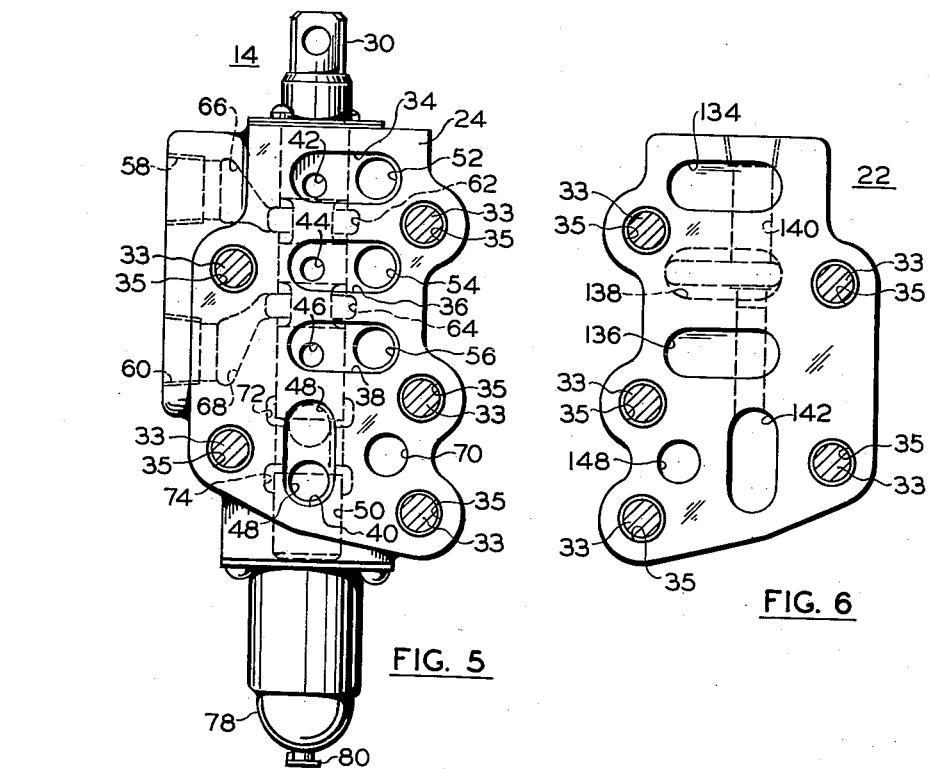
FIG. 5
FIG. 6
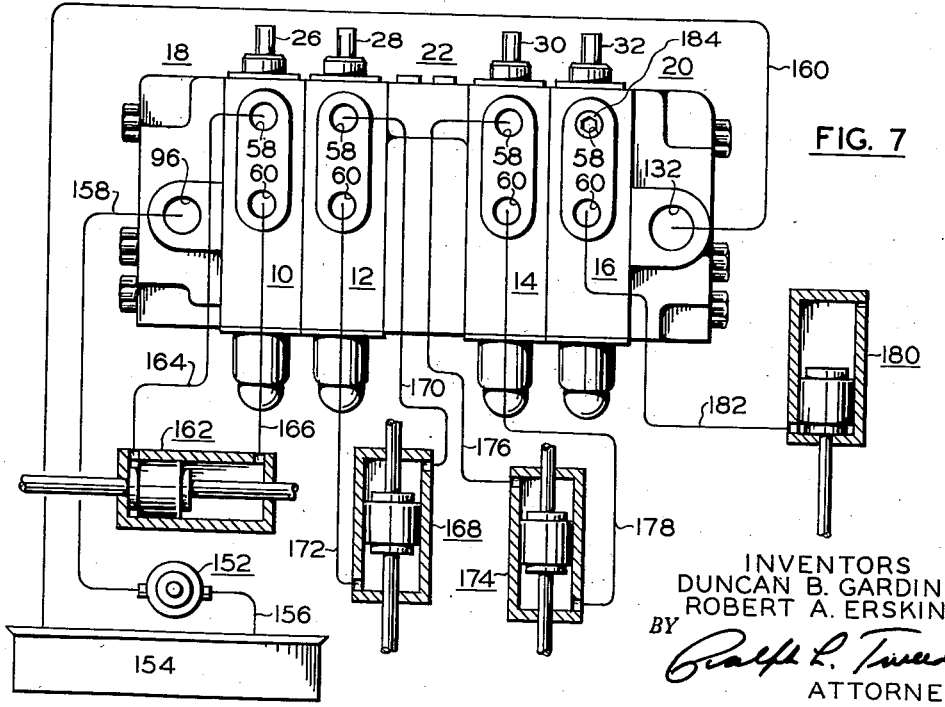
FIG. 7
INVENTORS
DUNCAN B. GARDINER
ROBERT A. ERSKINE
BY
Ralph L. Tweedale
ATTORNEY Patented Feb. 26, 1952

UNITED STATES PATENT OFFICE 2,586,932

POWER TRANSMISSION

Duncan B. Gardiner and Robert A. Erskine, Detroit, Mich., assignors to Vickers Incorporated, Detroit, Mich., a corporation of Michigan Application July 25, 1949, Serial No. 106,618

16 Claims. (Cl. 60—97)

This invention relates to power transmissions, and is particularly applicable to those of the type comprising two or more fluid pressure energy translating devices, one of which may function as a pump and another as a fluid motor.

The invention is more particularly concerned with manually actuated directional control valves, so constructed that they may be connected together in any sequence for controlling a plurality of either single-acting or double-acting hydraulic motors or both as may be desired. Multiple valve banks of this type are especially adapted for road machinery applications, such as on snow plows, where manual control of several different hydraulic appliances is necessary. The valve units of the multiple valve bank are designed so that they may be interchanged, added, or subtracted from the bank at will to meet various hydraulic applications.

In multiple valve banks of this general class, each unit comprises a housing having passages adapted to cooperate with passages of adjoining housings and a valve bore within which a valve spool is mounted and provided with lands for controlling communication between the passages connected to the valve bore.

Various attempts have been made in the past to provide good metering characteristics in systems of this type which would not only be economical but which would be obtained without causing other unfavorable operating characteristics such as pressure binding of the control valve spool, velocity flow conditions creating high forces opposing the normal operating force, and excessive leakage.

One of the most economical methods of construction is to provide passages connected to recesses forming ports at the valve bore and controlling these ports with lands on the spool of true cylindrical construction. Where the recesses are rough cast in the housing the cost is low and the recess which surrounds the valve bore prevents pressure binding of the valve spool. However, the metering characteristics are very poor because of the unfinished and rough condition of the recess and, in addition, high velocity flow through a partially opened recess acting against the exposed areas of the spool causes unequal forces tending to thrust the spool towards the closed position. One way of correcting this condition is to machine finish the recess and in addition provide notches, tapers, or flats on the spool. Although this results in good metering characteristics, the cost of the valve unit is appreciably increased.

It does not eliminate unfavorable velocity flow conditions, and in addition, the length of the control valve must be increased. Also, with cored construction, the body is weakened and deflects under high pressure with resultant spool bind and increased leakage.

Another method has been to simply drill a passage intersecting the valve bore and to use a valve spool having lands of true cylindrical form. In this case the cost is greatly lowered and fairly satisfactory metering characteristics are secured, but high pressure on only one side of the spool, particularly at the pressure supply port of the valve spool, causes binding of the valve spool.

Another great disadvantage of prior multiple valve bank systems was that although interchangeable housings were provided for controlling single and double-acting motors in any sequence or combination, each system was solely designed for either parallel or series operation of a plurality of motors. Although provision was made for operating one control unit singly to control one of the motors or two or more units simultaneously to control a plurality of motors, one type of multiple valve bank was required to produce parallel operation of the motors and an entirely different type of multiple valve bank was required to produce series operation of the motors.

It is therefore an object of this invention to provide a multiple bank control valve system having improved metering characteristics, which provides improved pressure balancing of shiftable control valve members to eliminate pressure binding while at the same time eliminating unfavorable flow conditions creating thrust forces opposing manual operating force, and which substantially lessens pressure leakage, all of which is achieved at lower cost than systems of the prior art type.

It is another object of this invention to provide in combination with the improved multiple bank control valve system having control valves which may be operated singly to control one motor or together to operate a plurality of motors in parallel, an adapter block which may be mounted between any two of the valve units in the bank to provide a series operation of two motors controlled by simultaneous operation of two control valves on opposite sides of the adapter block, and which still permits parallel operation of the motors by operation of any two control valves on one side of the adapter block.

It is still another object to provide an improved multiple bank control valve system of this general class which is completely adequate to meet a greater variety of hydraulic applications than prior systems of this type, which gives improved performance at lower cost and which will operate efficiently over a long and useful life.

Further objects and advantages of the present invention will be apparent from the following description, reference being had to the accompanying drawings wherein a preferred form of the present invention is clearly shown.

In the drawings:

Figure 1 is a longitudinal sectional view taken on the line 1—1 of Figure 2 of a multiple valve bank embodying a preferred form of the present invention.

Figure 2 is a plan view of the multiple valve bank.

Figure 3 is a sectional view taken on line 3—3 of Figure 2.

Figure 4 is a sectional view taken on line 4—4 of Figure 2.

Figure 5 is a sectional view taken on line 5—5 of Figure 2.

Figure 6 is a sectional view taken on line 6—6 of Figure 1.

Figure 7 is a diagrammatic view of a hydraulic power transmission system incorporating a preferred form of the present invention.

Referring now to Figure 1 there is shown a multiple valve bank comprising valve units 10, 12, 14, and 16, a pressure inlet connection member 18 and a return connection member 20 joined respectively to the left and right end units 10 and 16, and an adapter block 22 located between the valve units 12 and 14. The valve units 10, 12, 14, and 16 are comprised of identical housings 24 within which valve spools may be shiftably mounted for controlling a plurality of fluid motors. For the purpose of illustration, the valve units 10, 12, and 14 are shown with identical valve spools 26, 28, and 30 for controlling double-acting motors while the valve unit 16 is shown with a valve spool 32 for controlling a single-acting motor. It will be understood, however, that any number of valve units may be placed in sequence in the valve bank and that they may comprise double-acting, single-acting, or any combination of double-acting or single-acting valve units. The housings 24, adapter block 22, inlet connection member 18, and return connection member 20 are joined together by suitable through bolts 33 mounted in holes 35 extending through each member of the bank and registering with each other.

Referring to Figures 1 and 5, each housing 24 is provided with a plurality of directly opposed recesses on two of its opposing faces which form, respectively, from the top to the bottom of the housing 24, return ports 34, pressure ports 36, return ports 38, and by-pass ports 40. The recessed ports 34, 36, 38, and 40 are located so that they will register with corresponding ports of immediately adjoining housings. The ports 34, 36, 38, and 40 on opposing sides of the housing are respectively connected to a valve bore 50 by a return passage 42, a pressure passage 44, a return passage 46, and a by-pass passage 48. The passages 42, 44, 46, and 48 are preferably drilled so as to form two round holes at their points of intersection on opposite sides of the valve bore 50. In this manner, a graduated cut-off of the holes may be obtained by a valve spool having lands of true cylindrical form and without the use of flats, notches, or tapers which would have to be machined in the valve spool. Although the passages 42, 44, and 46 are shown to form holes directly opposite each other at the valve bore, it should be understood that favorable metering results may also be obtained by passages slightly offset lengthwise of the bore forming opposed holes at the valve bore although not directly opposed as illustrated.

In order to provide continuous pressure and return passages through the housings, a separate return passage 52, pressure passage 54, and return passage 56, are also drilled through the housing which do not intersect the valve bore 50 but which are respectively connected to the opposed return ports 34, pressure ports 36, and return ports 38. The passages 52, 54, and 56 cooperate with their corresponding recessed ports 34, 36, and 38 to which they are separately respectively connected to form continuous, manifold return and pressure passages through the housings so that the valve spools may be singly or simultaneously operated. The passages 52, 54, and 56, in cooperation with the recessed ports 34, 36, and 38, respectively, direct fluid to the passages 42, 44, and 46 on both sides of the valve bore 50 so as to prevent pressure binding of the valve spool.

Each housing is also provided with external motor ports 58 and 60 (Figure 5) which are connected to cored recesses 62 and 64, respectively, of the valve bore 50 by means of passages 66 and 68. Each housing 24 is also provided with a separate, drilled pressure relief passage 70 extending completely through the housing which does not intersect the valve bore 50 and is completely isolated from all other fluid passages of the valve bank. The passage is located so as to register with like passages in immediately adjoining housings and serves to conduct fluid from a pressure relief valve to a return connection of the bank in a manner which will subsequently be explained. A separate by-pass passage, similar to the passages 52, 54, and 56, is not provided because it is intended that the complete operation of any one of the valve spools should close the by-pass passage 48 extending through the valve bank. It should also be noted that the by-pass passage 48 of each housing 24 is actually a staggered passage which intersects cores 72 and 74 of the valve bore 50 from opposite sides of the housing, and also intersects the valve bore 50 below the core 72 and above the core 74 on opposite sides of the valve bore 50. In this manner, proper metering holes are provided similar to those formed at the intersection of the valve bore 50 by the passages 42, 44, and 46.

The valve spools 26, 28, 30, and 32 are biased to the neutral position shown by means of duplicate spring and retainer assemblies indicated generally by the numeral 76 which are mounted in end covers 78 suitably bolted to the housings 24 and which are provided with spring-biased venting flaps 80.

The spools 26, 28, and 30, which are adapted to control double-acting motors, are provided with end lands 82 and 84 and intermediate lands 86 and 88. In the position of the spools shown, the lands 82, 86, and 88, respectively, close the drilled passages 42, 44, and 46, and the lands 88 and 84 cooperate to leave the by-pass passage 48 open. The valve spool 32, which is adapted to control a single-acting motor, is provided with a large end land 90, which, in the position shown, closes both the tank passage 42 and the pressure passage 44, an intermediate land 92 closing the tank passage 46, and an end land 94 which cooperates with land 92 to leave the by-pass passage 48 open. The lands 92 and 94 are dimensioned to leave the by-pass passage open when the valve spool 32 is shifted downwardly to connect the motor port 60 to the tank.

Referring now to Figures 1 and 3, the inlet connection member 18 is provided with an external pressure connection port 96 leading directly to a vertical passage 98, the latter of which is closed at its upper open end by a hollow plug 100. The vertical passage 98 is connected by a transverse passage 102 to a recessed port 104 on the face of the member 18 which abuts housing 24 of valve unit 10. The recessed port 104 is adapted to register with the pressure port 36 of any of the housings 24. A check valve, indicated generally by the numeral 105 and mounted in the upper portion of vertical passage 98, permits free fluid flow from the vertical passage 98 to the transverse passage 102 and port 104 and prevents reverse flow. The transverse passage 102 also connects the vertical passage 98 to an adjoining vertical passage 106 within which a relief valve, indicated generally by the numeral 108, is mounted. The relief valve 108 normally is biased by a spring 109 to close the opening of a seat 110 mounted in the passage 106. Upon predetermined increases of pressure at the pressure connection port or in the pressure passage, the valve 108 is shifted downwardly to open the seat 110 to an exhaust chamber 112, formed in the lower portion of the passage 106. Connected to the exhaust chamber 112 is a transverse pressure relief passage 114 which extends to the face of the connection member 18 abutting valve unit 10, and which is adapted to register with the pressure relief passage 70 of any of the housings 24. The vertical passage 98 is also connected at its lower end by a transverse passage 116 to a recessed by-pass port 118 also on the face of the connection member 18, facing the valve unit 10, the port 118 being adapted to register with any of the recessed by-pass ports 40 of the housings 24. The pressure connection member 18 closes the return passages 52 and 56 at one end thereof and their related recessed ports 34 and 38, respectively, when joined to any of the housings 24.

Referring to Figures 1 and 4, the return connection member 20 is provided with a fluid return chamber 120 directly connected to which are cored, recessed return ports 122 and 124 and a by-pass port 126 which are adapted to register, respectively, with the cooperating recessed return ports 34 and 38 and the by-pass port 40 in any of the housings 24. The connection member 20 is also provided with a separate pressure relief passage 128 adapted to register with the pressure relief passage 70 of any of the housings 24 and which is connected to the chamber 120 by a cored passage 130. An external return port 132 is directly connected to the return chamber 120. The return connection member 20 closes the pressure passages 54 at one end and its corresponding recessed port 36 when joined to any of the housings 24.

When a series, rather than a parallel operation of any two of the motors, is desired, the adapter block 22 may be mounted between any two of the housings 24 to secure the desired series operation results.

As shown in Figures 1 and 6, the adapter block is provided with recessed return ports 134 and 136 on one face thereof, which are adapted to register with the return ports 34 and 38 of any of the housings 24 and also provided with a recessed pressure port 138 on the opposing face adapted to register with the pressure port 36 of any of the housings 24. The return ports 134 and 136 intersect a vertical passage 140 leading directly to a large auxiliary manifold passage 142 extending completely through the block, the latter of which is adapted to register with the by-pass ports 40 of any of the housings 24. The passage 142 is connected by a vertical passage 144 to the pressure port 138. Mounted in the upper portion of passage 144 is a check valve 146 permitting free fluid flow from the passage 144 to the pressure port 138. A separate pressure relief passage 148 extends through the block 22 which is adapted to register at its opposite ends with the pressure relief passages 70 in any of the housings 24 on either side thereof.

The adapter block 22 closes the pressure passage 36 of one adjoining housing and closes the return passages 34 and 38 of the opposite adjoining housing. When valve spools on opposite sides of the block 22 are simultaneously operated, the return flow from a motor controlled by a valve unit on the left of the block must be returned through one of the return ports of a valve unit on the left of the block 22 to the large through passage 142 of the block 22 from whence it is connected to the pressure port, and a motor port of a valve unit on the right side of the block to operate said motors in series. The check valves 105 and 146 in the pressure connection member 18 and adapter block 22, respectively, prevent motor drop on changeover of porting connections. When the adapter block 22 is utilized, the check valve 105 provides this protection for motors controlled by valve units on the left of the block. Check valve 146 provides protection for motors controlled by valve units on the right of the block. When the adapter block 22 is not utilized the check valve 105 serves to provide this protection for all motors controlled by the bank of control valves. Suitable gaskets 150 may be mounted between the members comprising the valve bank which contain holes adapted to register and cooperate with those of adjoining member units. Suitable seals 151 and 153 are mounted in recesses surrounding the valve bore 50, respectively, at the upper and lower ends of the bore. Suitable seals 155 are also provided at the upper ends of the valve units which surround the upper portion of the valve spool and are held in place by plates 157 screwed to the housings.

Referring to Figure 7, for the purpose of illustrating the operation of one form of the present invention, there is shown a hydraulic power transmission system comprising a pump 152, which may be driven by any suitable prime mover, not shown, having its inlet connected to a tank 154 by a supply conduit 156 and its outlet connected to the pressure connection port 96 of the inlet connection member 18 by means of a conduit 158. The return connection port 132 of the outlet connection member 20 is connected to the tank 154 by a conduit 160. The motor ports 58 and 60 of the valve unit 10 are connected to opposite ends of a double-acting motor 162 by means of conduits 164 and 166. The motor ports 58 and 60 of the valve unit 12 are connected to the opposite ends of a second, double-acting motor 168 by means of conduits 170 and 172. The motor ports 58 and 60 of the valve unit 14 are connected to the opposite ends of a third, double-acting motor 174 by means of conduits 176 and 178. The motor port 60 of the valve unit 16 is connected to the bottom end of a single-acting motor 180 by means of a conduit 182. The remaining motor port 58 of said valve unit may be conveniently closed by a suitable plug 184.

In operation, with the adapter block 22 mounted between the valve units 12 and 14, any one valve spool on either side of the adapter block 22 may be operated to control the motor with which it is individually related. When two valve spools on one side of the adapter block are operated, the motors which they control will be operated in parallel. When two valve spools are operated on opposite sides of the adapter block 22, a series operation of the two motors which they control will result.

Referring to Figures 1 and 7, with the adapter block 22 mounted between the valve units 12 and 14, the valve spools in the position shown, and the pump 152 in operation, pressure fluid is delivered through conduit 158 to the pressure connection port 96 of the inlet connection member 18 and by means of the vertical passage 98, transverse passage 116, and recessed port 118 to the recessed port 40 of the valve unit 10. The lands 80 and 84 of the valve spools 26, 28, and 30 and the lands 92 and 94 of the valve spool 32 permit free flow of fluid through the by-pass ports 40 and the by-pass passages 48 of the valve units 10, 12, 14, and 16 to the return chamber 120 of the outlet connection member 20. Fluid is also free to flow through the passage 142 of the adapter block 22 which registers with the recessed by-pass ports 40 of the immediately adjoining valve units 12 and 14.

Although fluid may flow from the passage 142 of the adapter block 22 to the vertical passage 140 and to the return passages 42 and 46 and auxiliary tank passages 52 and 56 of valve unit 12 by means of recessed ports 122 and 124, the lands 82 and 88 of the valve spool 28 close return passages 42 and 46 at the valve bore 50 of the valve unit 12, and the return passages 52 and 56 which do not intersect the valve bore 50 are closed by the pressure connection member 18.

Fluid may also flow from passage 142 of the adapter block 22 to the pressure passage 44 and auxiliary pressure passage 54 of the valve unit 30 by means of vertical passage 144, check valve 146, and ports 138 and 36, respectively, of the adapter block 22 and valve unit 14. However, the passage 44 is closed at the valve bore 50 of the valve unit 14 by the land 86 of the valve spool 30, and the auxiliary pressure passage 54 which does not intersect the valve bore 50 is closed at the right end thereof by member 20.

Fluid from the pump 152 entering the return chamber 120 of the member 20 is conducted to the tank 154 by means of return connection port 132 and conduit 160. Thus, with all of the control valve spools of the bank in the neutral position shown, the full delivery of the pump 152 is by-passed to the tank 154 through the continuous by-pass passage formed in the multiple valve bank.

If it is desired to operate the motor 162 in a rightward directional movement, the valve spool 26 of the valve unit 10 is shifted downwardly to connect the pressure passage 44 to the motor recess 62 and the motor recess 64 to the return passage 46. The land 86 of the valve spool 26 uncovers the pressure passage 44 and blocks flow from the pressure passage 44 to the valve bore recess 64 connected to the motor port 60. The bypass passage 48 is closed by the land 88. The lands 86 and 88 cooperate in connecting the valve bore recess 64 to the return passage 46. Pressure fluid from the pump 152 is delivered to the pressure passage 44 of valve unit 10 by means of conduit 158, pressure connection port 96 of inlet connection member 18, vertical passage 98, check valve 106, passage 102, recessed port 104, and recessed port 36 of valve unit 10. From the pressure passage 44 fluid is conducted to the left end of motor 162 by means of valve bore 50, recess 62, passage 66, motor port 58, and conduit 164. Fluid displacement from the right end of motor 162 is returned to the return passage 46 of valve unit 10 by means of conduit 166, external motor port 60, passage 68, and valve bore recess 64. The return passage 46 of valve unit 10 is connected to the passage 142 of block 22 by means of the ports 38 and passages 56 of the valve units 10 and 12 and the passages 124 and 140 of the adapter block 22. Fluid displacement from the motor 162 entering the passage 142 of the adapter block 22 is conducted to the tank 154 by means of the ports 40 and by-pass passages 48 of the valve units 14 and 16, return chamber 120 and port 132 of outlet member 20 and conduit 160.

It should be noted that land 86 of the valve spool 28 of valve unit 12 closes valve bore 50 of that unit to pressure flow and that the adapter block closes the pressure passages at the valve unit 12. The adapter block 22 closes the return passages of the units to the right of the block.

The motors 162 and 168 may be operated in parallel by simultaneously shifting the valve spools 26 and 28. If the valve spools 26 and 28 are simultaneously shifted upwardly, for instance, the by-pass passage 48 is closed and the pressure connection 96 is connected through the pressure passages 44 of the valve units 10 and 12 to the valve bore recess 64 of each unit, the latter of which are connected, respectively, to the right end and bottom of motors 162 and 168. Displacement from the motors is separately conducted to the valve bore recesses 62 of the units 10 and 12 and conducted by the return passages 42 and 34 of said units to the passages 138, 140, and 142 of adapter block 22 from whence it is delivered to the return connection member 20 by means of the by-pass passages 48 in the valve units 14 and 16.

Thus, when one or more of the valve spools to the left of the adapter block 22 are shifted to operate the motors which they control, the return flow from the motor or motors is delivered by the return passages of the units to the left of the adapter block 22 to the manifold passage 142 of the block 22 and from passage 142 to the by-pass passages 48 of the units on the right side of the adapter block 22 and thence to the return connection member 20.

Conversely, when one or more of the valve spools to the right of the adapter block 22 are shifted to operate the motors which they control, pressure fluid from the pump is delivered to the pressure passage of the valve units being operated by means of the by-pass passages on the left of the adapter block and the auxiliary passage 142 of the adapter block 22, and fluid displacement from the motors is delivered to the outlet member 20 through the return passages of the valve units to the right of the adapter block 22.

For example, when valve spool 30 of valve unit 14, on the right of adapter block 22, is shifted downwardly to operate the motor 174 in a downward directional movement, pressure fluid from the pump 152 entering the inlet connection member 18 is blocked at the valve bore 50 of valve unit 10 by the land 86 of spool 26. Pressure fluid is delivered, however, to the auxiliary passage 142 of adapter block 22 by means of the port 96, passage 116, and port 118 of inlet member 18, and the by-pass ports 40 and by-pass passages 48 of the valve units 10 and 12. From the auxiliary passage 142 of the block 22 fluid is delivered to the upper end of motor 174 by vertical passage 144, check valve 146, and passage 138 of adapter block 22, pressure port and pressure passages 36 and 44 of valve unit 14, valve bore 50, recess 62, passage 66, motor port 58, and conduit 176. Fluid displaced from the lower end of motor 174 is returned to tank 154 by means of conduit 178, motor port 60, passage 68, recess 64, valve bore 50, return passage 46, the ports 38 of valve units 14 and 16, and the return passage 56 of valve unit 16, return chamber 120 and outlet port 132 of member 20, and conduit 160.

If, for another example, valve spools 30 and 32 of the valve units 14 and 16 are simultaneously shifted upwardly, the motors 174 and 180 are connected for parallel operation as follows. The pressure connection 96 is connected to the pressure passage 44 and the valve bore recesses 64 of both units 14 and 16, the latter recesses being separately connected to the bottom ends of the motors 174 and 180. The upward movement of the pistons within the double acting motors 162, 168, and 174 causes fluid in the upper ends thereof to be displaced to the recesses 62 of the valve units 14 and 16, and fluid is delivered to the return connection member 20 by means of the tank passages 42 and 52 in the units 14 and 16.

Thus, the adapter block permits single operation of any one of the valve spools to individually operate the motors which they control, or permits simultaneous operation of any two control valve spools on one side of the adapter block to operate the motors which they control in parallel.

However, when two valve spools on opposite sides of the adapter block 22 are operated, a series operation of the motors which they control will result. For example, if spool 28 of the valve unit 12 and spool 30 of the valve unit 14 are simultaneously shifted downwardly, pressure fluid will be directed by the valve unit 12 to the upper end of motor 168, fluid displacement from the motor 168 will be returned to the valve unit 10, and the adapter block 22 in cooperation with the valve unit 14 directs the return displacement from motor 168 to the motor port 58 of valve unit 14 from whence it is conducted to the upper end of motor 174. The displacement from the lower end of motor 174 is conducted to the motor port 60 of the valve unit 14 which is connected to the tank. More specifically, the preceding series operation of motors 168 and 174 is produced as follows. Pressure fluid delivered to the inlet connection port 96 of the inlet member 18 is conducted through the vertical passage 98, check valve 100, passage 102, and port 104 to the pressure port 36 of valve unit 10. Although land 86 of the spool 28 blocks the pressure passage 44 of the valve unit 10, pressure fluid is conducted to the pressure passage 44 of the valve unit 12 by means of the pressure ports 36 and manifold pressure passage 54 of the valve unit 10, and pressure port 36 of the valve unit 12. The pressure passages 44 and 54 are closed at the adapter block 22. The by-pass passage 48 of the valve unit 12 and the valve unit 14 are closed by the lands 88 of the valve spools 28 and 30.

Pressure fluid in the pressure passage 44 of the valve unit 12 is then conducted by means of the valve bore 50, recess 62, passage 66, motor port 58, and conduit 170 to the upper end of motor 168. Fluid displacement from the lower end of motor 168 is conducted to the auxiliary passage 142 of the adapter block 22 by conduit 172, motor port 60, passage 68, recess 64, valve bore 50, return passage 46 and return port 38 of valve unit 12, and return port 136, and vertical passage 140 of adapter block 22. From the auxiliary passage 142, the displacement from motor 168 is conducted to the upper end of motor 174 by means of vertical passage 144, check valve 146, and port 138 of block 22, pressure port 36, pressure passage 44, valve bore 50, recess 62, passage 66, and motor port 58 of valve unit 14 and the conduit 176. Fluid displacement from the lower end of motor 174 is delivered to the return chamber 120 of outlet member 20 and thence to tank 154 by means of conduits 178, motor port 60, passage 68, recess 64, valve bore 50, return passage 46 and return port 38 of valve unit 14, and return port 38 and auxiliary tank passage 56 of unit 16.

If valve spools 26 and 30, or 26 and 32, or 28 and 30, or 28 and 32, are simultaneously shifted, i. e., any two spools on opposite sides of the adapter block 22, a series operation of the two motors which they control will result. Pressure fluid will be delivered to the pressure passage of the valve unit on the left of the block from whence it will be delivered to one of the motor ports thereof, and fluid displacement from the motor which that valve unit controls will be connected through the cooperating passages in the adapter block 22 to the pressure port and one motor port of the valve unit on the right of the adapter block. The displacement from the motor controlled by the unit on the right of the adapter block will be returned through one or more of the return passages and ports of units on the right of the block to the return chamber and return port of the outlet connection member 20 to the tank.

If, at any time, the pressure in the pressure passages of the units, or at the pressure connection 96, reaches a maximum determined by the setting of spring 109 which biases relief valve 108 to the closed position, the relief valve 108 will be forced from the seat 110 and open the same.

The pressure connection 96 is then open to the return connection port 132 through the separate isolated relief valve passages provided in the housings of the several valve units and the adapter block. This communication is established through the open seat 110, exhaust chamber 112, and pressure relief passage 114 of the pressure connection member 18, the pressure relief passages 70 of valve units 10 and 12, pressure relief passage 148 of adapter block 22, the pressure relief passages 70 of valve units 14 and 16, pressure relief passages 128 and 130 of return connection member 20, and the return chamber 120 thereof which is connected to the return connection port 132.

The provision of a separate pressure relief passage, both in the housings and the adapter block, all of which register with each other, is a very important factor in permitting the use of the adapter block shown and described for permitting both single operation, parallel operation, and series operation of a plurality of motors controlled by the multiple valve bank. The adapter block may be omitted from the multiple valve bank and single and parallel operation of motors still be provided with adequate maximum pressure protection. When the adapter block is removed from the multiple valve bank, the pressure relief passages of the several housings form a continuous passage isolated from the other passages of the valve bank which connects the pressure connection to the return connection when maximum pressures have been reached.

In any application where series operation of motors is not desired, the adapter block 22 may be omitted from the multiple valve bank. In such case, through return passages 52 and 56 are formed in the housings with the cooperation of the recessed ports 34 and 38, said return passages being connected at one end to the return chamber 120 of the connection member 20 and closed at the opposite end by the pressure connection member 18. Through pressure and by-pass passages are also formed, respectively, by the passages 54 and 48 with the cooperation, respectively, of the recessed ports 36 and 40. The pressure passage is connected at one end to passages leading to the pressure connection 96 and is closed at its opposite end by the return connection member 20. The by-pass passage 48 is connected at one end to passages leading to the pressure connection 96 and connected at its opposite ends to the return chamber 120 of the connection member 20. The complete shifting of any one of the control valve spools will close the continuous by-pass passage 48. In addition, pressure relief is provided by the separate isolated pressure relief passage extending completely through the housings 24 and which is controlled by the pressure relief valve connected to the pressure connection 96, said relief passage being open at its other end to the tank return chamber 120.

Thus, if spool 32 is shifted upwardly pressure fluid is delivered by means of the recessed ports 36 and the auxiliary pressure passages 54 in the valve units 10, 12, and 14 to the pressure passage 44 of valve unit 16 where it is delivered to the valve bore 50, and recess 64 and thence to the motor. If valve spool 32 is shifted downwardly, the bottom end of the motor is connected to tank by means of conduit 182, motor port 60, passage 68, recess 64, return passage 46, recessed port 38, return chamber 120, port 132, and conduit 160.

If, for another example, valve spool 26 is shifted upwardly, pressure fluid is delivered to the pressure passage 44 of the valve unit 10 and thence by valve bore 50, recess 64, passage 68, motor port 60, and conduit 166 to the right end of motor 162.

The displacement from motor 162 is returned to the recess 62 and valve bore 50 and conducted by the return passage 42 and port 34 of the valve unit 10 to the port 34 of the valve unit 12 which is connected to the auxiliary return passage 52. The return passage 52 is connected directly to the return chamber 120 of the connection member 20 by the recessed ports 34 of each adjoining housing.

Any two valve spools of the valve units may be simultaneously operated to produce parallel operation of the motors which they control; for example, if valve spool 26 and valve spool 30 are simultaneously operated, pressure fluid is delivered to the pressure passage 44 of the valve unit 10 and by means of the through pressure passage 54 in cooperation with the recessed ports 36 to the pressure passage 44 of the valve unit 14. The valve spools of the units 26 and 30 direct fluid to one of the motor ports of said units. Return flow is conducted from the valve unit 10 to one of the through return passages 52 and 56 of the adjoining units in cooperation with the recessed ports 34 and 38 to the return chamber 120 of outlet member 20. Likewise, return flow conducted to the valve unit 14 is returned to the connection member 20 by one of the same through return passages in the adjoining units.

It should be noted that when only one double-acting valve is shifted to operate the motor which it controls, that communication is established between the pressure passage and one of the motor ports and between the remaining motor port and a return passage before the by-pass passage is closed. As the by-pass passage closes, a pressure is built up sufficient to overcome load bias but below relief valve pressure. When pressure is sufficient to overcome the load bias and the by-pass continues to close, an increasing amount of fluid will be delivered to the motor and a lesser amount by-passed until the by-pass is completely closed and the total displacement of the pump is delivered to the motor. Accurate control of a single motor is thus obtained by metering over the by-pass passage. Although the by-pass passage 48 intersects the cored recesses 72 and 74 on opposite sides thereof, the passage 48 also intersects the valve bore 50 on one side below the recess 72 and on the opposite side above the recess 74. The construction is such that when one of the double-acting spools is shifted downwardly or upwardly, the recesses 72 and 74 are in continuous communication with the passage 48 until the land 88 or land 84 completely covers the passage 48. In this manner pressure bind of the spool is prevented because of equal pressure surrounding the spool. Accurate metering is obtained by the lands 88 and 84 (which, it should be noted, are of true cylindrical form, thus avoiding the expense of tapers, notches, and flats) passing over round holes formed on opposite sides of the bore by the passage 48 intersecting the valve bore 50.

Pressure binding of the spool at the intersection of the pressure passage 48 and return passages 42 and 46 is also prevented because the recessed ports on opposite faces of the housing cooperate with their associated manifold through passages to deliver fluid to the passages 48, 42, and 46 on opposite sides of the spool so as to pressure balance the spool.

In addition, when any one valve spool has been shifted completely and is retained in operating position, a second valve spool may be shifted to operate the motor which it controls and accurate metering will be obtained by the lands of the valve spools passing over the holes formed on opposite sides of the valve bore by the intersection of said bore of the pressure passage 44 and tank passages 42 and 46. These passages may be considered as metering passages. With the by-pass passage closed, because of the complete operation of one of the spools, accurate metering is still obtained by the gradual closing of the pressure passage 44, and the gradual opening of one of the return passages 42 or 46. The dimensions of the lands of the valve spools for controlling double-acting motors may be constructed as illustrated so that there is both a "metering in" through the gradually opened pressure passage and a "metering out" through the return passage from which fluid is returning from the motor.

Accurate metering for a motor series operation may be provided by utilizing valve spools having lands of true cylindrical construction but proportioned so as to close the by-pass passage simultaneously with the opening of the pressure passage to a motor port and which, in cooperation with the drilled passage construction of the valve housing, gradually open the pressure passage to said motor port. It should be noted, however, that this type of valve spool is not necessary for providing a motor series operation, and that the type of valve spool illustrated may be utilized when the adapter block is mounted in the valve bank for providing accurate metering for single and parallel operation of the motors connected to the valve bank.

It should also be noted that there is an absence of valve bore cored recesses at the pressure and supply passage points of intersection with the valve bore. The drilled pressure and return passages forming round holes at their point of intersection with the valve bore are an improvement over the conventional construction of an annulus either machined or cored in the bore because the average leakage path with the drilled holes is much longer and the increased seal thus obtained materially lessens leakage flow. In addition, the drilled holes do not materially reduce body metal at the critical sealing areas which improves body rigidity and prevents deflection under pressure which would cause spool bind and increase leakage.

It should be further noted that when any single-acting control valve is shifted so as to lower a load carried by a single-acting motor, that accurate metering and control of the lowering operation is provided by the land 92 of the spool 32 gradually opening up the return passage 46. Fluid returning from the motor enters the motor port 60 and is conducted to the recess 64 and valve bore 50 from whence it is returned to the connection member 120. The return flow from the motor may be accurately metered through the return passage at the valve bore by the land 92.

The auxiliary pressure and return passages which extend through each housing are connected to each other by the recessed ports formed on opposing faces of each housing so as to form manifold pressure and return passages. Thus, no matter how many housings are joined together to form the multiple valve bank the auxiliary passages in cooperation with the recessed ports are joined together to form continuous pressure and return passages extending completely through the bank of housings. Pressure balancing of the valve spools is accomplished by coaction of the recessed ports in connecting the manifold pressure and return passages to the drilled passages which intersect the valve bore on opposite sides. In this manner pressure fluid does not react against one side of the spool but reacts simultaneously against opposite sides of the spool.

The drilled passage construction results in two opposing openings or round port holes being formed on opposite sides of the valve bore. As the valve spool is shifted from the neutral position, both openings or ports at the valve bore are opened to permit fluid flow to take place simultaneously through both openings or ports. It is important to note that when the land of the valve spool passes over the opposed openings or ports that the exposed area of the spool for any given volume is much less than in prior art constructions of the type having an annulus forming an enlarged port at the bore. In constructions of the latter type, high velocity flow obtained by pressure drop at the annulus creates unequal pressure forces which react on the large exposed areas of the valve spool lands and tends to create a high thrust interfering with the manual operating force utilized in shifting the valve spool. The present invention in providing a drilled passage intersecting the valve bore at two points and which forms round holes on opposite sides of the bore, rather than a passage intersecting a large annulus as provided in prior art types, thus decreases the area of the land exposed to fluid flow which materially decreases the amount of thrust tending to interfere with manual operation of the valve.

In summary, there is provided a multiple valve bank comprising housings within which valve spools are mounted and which may be mounted in adjoining relationship without the adapter block to provide single operation of double-acting and single-acting motors and parallel operation of double-acting and single-acting motors. The adapter block may be mounted between any two of the valve units to provide single control of any double or single-acting motor, parallel operation of two motors when two valves are operated on one side of the adapter block and a series operation of two motors when two control valves are operated on opposite sides of the valve block.

The housings have been made substantially stronger by the elimination of cored recesses at the pressure supply and return passage points of intersection with the valve bore. The construction of the drilled passages intersecting the valve bore on opposite sides thereof, in cooperation with the recessed ports and auxiliary passages prevent pressure binding of the valve spool, result in improved leakage characteristics as compared with prior construction types, and provides good metering characteristics without the use of tapers, notches, or flats machined on the valve spool.

While the form of embodiment of the invention as herein disclosed constitutes a preferred form, it is to be understood that other forms might be adopted, all coming within the scope of the claims which follow.

What is claimed is as follows:

1. A multiple valve bank comprising a series of interchangeable housings arranged in abutting relationship, each housing having a valve bore, at least one motor port connected to the bore, and pressure and return passages extending through the housing and connected to the bore, said passages being located to join with like passages in immediately adjoining housings, said valve bank including at least one housing having two motor ports connected to said bore each housing also having a separate, single purpose, pressure relief passage extending therethrough isolated from the other passages of the housing and arranged to join with like passages in immediately adjoining housings, means forming a pressure connection and a return connection joined to said housings and respectively hydraulically connected to the pressure and return connections while closing said passages at one end thereof, said pressure connection and return connection being hydraulically connected to opposite ends of the continuous pressure relief passage formed in the bank, control valves mounted in the valve bores for selectively connecting the pressure and return passages to the motor ports at least one of said control valves being of the type for controlling a double acting motor, and a pressure relief valve joined to one of said housings and arranged in response to predetermined increases of pressure at the pressure connection to connect the pressure connection to the return connection through the isolated pressure relief passage.

2. A multiple valve bank comprising in combination a plurality of interchangeable housings positioned together to form a manifold having continuous pressure and return passages which are closed at one end and respectively connected at their opposite ends to a pressure and a return connection joined to said housings, each housing having at least one motor port and a control valve operable for selectively controlling communication between the pressure and return passages and the motor ports, said valve bank including at least one housing having two motor ports and a control valve therein of the type for controlling a double acting motor, means forming a continuous, single purpose, pressure relief passage through the housings connected at opposite ends to the pressure and return connections and completely isolated from all other passages in the bank, and a pressure relief valve joined to one of said housings and arranged to be responsive to predetermined increases of pressure at the pressure connection for opening communication between the pressure connection and the return connection through the isolated pressure relief passage.

3. A multiple valve bank comprising in combination a plurality of interchangeable housings positioned together to form a manifold having continuous pressure and return passages which are closed at one end and respectively connected at their opposite ends to a pressure and a return connection joined to said housings, each housing having at least one motor port and a control valve operable for selectively controlling communication between the pressure and return passages and the motor ports, said valve bank including at least one housing having two motor ports and a control valve therein of the type for controlling a double acting motor, means forming a continuous by-pass passage through the housings connected at opposite ends to the pressure and return connections, said by-pass passage being normally open and being closeable by the operation of any control valve, means forming a continuous, single purpose, pressure relief passage through the housings connected at opposite ends to the pressure and return connections and completely isolated from all other passages in the bank, and a pressure relief valve joined to one of said housings and arranged to be responsive to predetermined increases of pressure at the pressure connection for opening communication between the pressure connection and the return connection through the isolated pressure relief passage.

4. In a multiple valve bank the combination of a plurality of valve units joined together to form a manifold having continuous pressure, return, and by-pass passages, each unit comprising a housing including at least one motor port, and a control valve shiftably mounted therein, said pressure and return passages extending through the housings and being closed at one end thereof and respectively connected at their opposite ends to a pressure and return connection joined to said housings, said pressure and return connections being connected to the opposite ends of the by-pass passage, and each control valve being operable to selectively connect the pressure and return passages to the motor ports while closing the by-pass passage and having a neutral position leaving the by-pass passage open, said valve bank including at least one valve unit comprising a housing having two motor ports and a control valve therein of the type for controlling a double acting motor, means forming a continuous, single purpose, pressure relief passage extending through the housings isolated from the pressure, return, and by-pass passages and connected at opposite ends to the pressure and return connections, and a pressure relief valve arranged to normally close communication between the pressure and return connections through the pressure relief passage, said relief valve being responsive to predetermined pressure increases at the pressure connection to connect the pressure connection to the return connection through the isolated pressure relief passage.

5. A multiple valve control system adapted to be used in a hydraulic power transmission for controlling a plurality of fluid motors and comprising in combination a plurality of valve housings, each of which is provided with a control valve bore, pressure, return, and by-pass passages extending through the housing and connected to the bore, and at least one motor port connected to the bore, said passages being located such that similar passages of the housings will join with each other when said housings are placed side by side in any sequence in a bank to form continuous manifold passages, and an auxiliary manifold block mountable between any two of said housings and having an auxiliary manifold passage extending therethrough located such that it joins with the by-pass passages of housings on opposite sides of the block, and passage means connected to the auxiliary pasage located such that the passage means joins with the return passages of housings on one side of the block and joins with the pressure passage of housings on the opposite side of the block.

6. A multiple valve bank control system adapted to be used in a hydraulic power transmission for controlling a plurality of fluid motors and comprising in combination a plurality of valve housings, each of which is provided with a control valve bore, pressure, return, and by-pass passages extending through the housing and connected to the bore, and at least one motor port connected to the bore, said passages being located such that similar passages of the housings will join with each other when said housings are placed side by side in any sequence in a bank to form continuous manifold passages, means forming a pressure connection joined to one housing and a return connection joined to another housing, said pressure connection being hydraulically connected to the pressure and by-pass passages of said housing and including means for closing the return passages at one end, and said return connection being hydraulically connected to the return and by-pass passages of said other housing and including means for closing the pressure passage at one end, and an auxiliary manifold block mountable between any two of said housings and having an auxiliary manifold passage extending therethrough located such that it joins with the by-pass passages of housings on opposite sides of the block, and passage means connected to the auxiliary passage located such that the passage means joins with the return passages of housings on one side of the block and joins with the pressure passage of housings on the opposite side of the block.

7. A control system for use in a hydraulic power transmission having means forming a source of pressure fluid and a plurality of fluid motors and comprising in combination a plurality of interchangeable valve units mounted together side by side to form a valve bank having continuous manifold passages and including a single pressure connection and a single return connection for the manifold passages, each valve unit having at least one motor port and a control valve, said control valves being operable separately and together for controlling the passages of the bank in such a manner that the motors associated with the valve units may respectively be operated individually and in parallel, and an auxiliary manifold block mountable between any two of the valve units and having at least one through passage joined with a manifold passage of the valve bank, and passage means connected to said through passage and joined with the continuous passages on opposite sides of the block in such a manner that any one control valve is operable for individually controlling a motor adapted to be associated therewith, a plurality of control valves completely on one side or the other side of the block may be operated together to control the motors adapted to be associated therewith in parallel and any two control valves on opposite sides of the block may be operated together to cause a series operation of the motors associated with said valve units.

8. A control system for use in a hydraulic power transmission having means forming a source of pressure fluid and a plurality of fluid motors and comprising in combination a plurality of interchangeable valve units mounted together side by side to form a valve bank having continuous manifold passages and including a single pressure connection and a single return connection for the manifold passages, each valve unit having at least one motor port and a control valve, said control valves being operatable separately and together for controlling the passages of the bank in such a manner that the motors associated with the valve units may respectively be operated individually and in parallel, and an auxiliary manifold block mountable between any two of the valve units and having at least one through passage joined with a manifold passage of the valve bank, and passage means connected to said through passage and joined with the continuous passages on opposite sides of the block in such a manner that any two control valves on opposite sides of the block may be simultaneously operated for causing a series operation of the motors adapted to be controlled by said valve units.

9. A control valve bank for use in a hydraulic transmission having means forming a source of pressure fluid and a plurality of fluid motors and comprising in combination a plurality of housings arranged in series in abutting relationship to form a manifold including a pressure connection and a return connection and having continuous manifold pressure and return passages closed at one end and respectively connected at their opposite ends to the pressure and return connection, and a continuous manifold by-pass passage connected at opposite ends to the pressure and return connection, each housing having at least one motor port and a control valve, said control valves being operable individually and together for closing the by-pass passage and connecting the pressure and return passages to the motor ports of one or more housings for operating the motors adapted to be associated therewith individually or in parallel, and an auxiliary manifold block mountable between any two of said housings and having an auxiliary manifold passage joinable with the continuous manifold by-pass passage, and passage means connected to the auxiliary passage adapted to join with the manifold return passages on one side of the block and with the manifold pressure passage on the other side of the block, whereby any one control valve and a plurality of control valves on one side or the other side of the block may be operated singly and together for individual and parallel operation of the motors which they control, and any two control valves on opposite sides of the block may be simultaneously operated for causing a series operation of the motors which they control.

10. In a hydraulic power transmission system having means forming a source of pressure fluid and a plurality of fluid motors, a multiple valve bank comprising a series of valve units joined together to form a manifold including a pressure connection and a return connection and continuous manifold pressure, return, and by-pass passages, each valve unit having at least one motor port connected to a motor associated with the valve unit and a control valve for controlling said motor, said control valves being operable singly and together to respectively cause the motors associated therewith to be operated singly and in parallel, and an auxiliary manifold block mountable between any two valve units having an auxiliary manifold through passage joined with the manifold by-pass passage, and passage means connected to the auxiliary passage and joined with the manifold return passages on one side of the block and with the manifold pressure passage on the other side of the block whereby any one control valve may be operated, and a plurality of control valves completely on one side or the other side of the block may be operated together, respectively, for individual and parallel operation of the motors which they control, and any two control valves on opposite sides of the block may be simultaneously operated for causing a series operation of the motors which they control.

11. In a hydraulic power transmission having means forming a source of pressure fluid, and a plurality of fluid motors, the combination therewith of means forming a manifold having a pressure connection and a return connection which are respectively hydraulically connected to the pump and the supply source, said manifold comprising a series of valve housings joined together; each housing having at least one motor port connected to a motor associated therewith, a plurality of passages arranged to join with corresponding passages of immediately adjoining housings to form continuous passages through the series of housings including manifold pressure return and by-pass passages, and a control valve shiftably mounted in the housing, said control valves having a neutral position for leaving the by-pass passage open and being operable individually and together to connect the pressure and return passages to the motor ports for single and parallel operation of the motors which they control; and an auxiliary manifold block mountable between any two of the housings and having a plurality of passages arranged to cooperate with the pressure, return, and by-pass passages of the manifold in such a manner that any one control valve is operable for single operation of the motor associated therewith, a plurality of control valves completely on one side of the block are operable together for parallel operation of the motors associated therewith, and any two control valves on opposite sides of the block are operable together to produce a series operation of the motors associated therewith.

12. A valve housing for use in a multiple valve bank, said housing having a bore for receiving a shiftable control valve member, at least one external operating port connected to the bore, means forming a metering passage which intersects the bore and having an opening on a face of the housing, a manifold passage extending completely through the housing on a different plane than the valve bore and having openings on opposing faces of the housing including the face of the housing having the metering passage opening, and means connecting the metering passage to the manifold passage.

13. A valve housing for use in a multiple valve bank, said housing having a bore for receiving a shiftable control valve member, at least one external operating port connected to the bore, means forming a metering passage which intersects the bore on opposite sides thereof and having an opening on at least one face of the housing, a manifold passage extending completely through the housing to opposing faces of the housing including the face of the housing having the metering passage opening and being on a different plane than the control valve bore, and a recessed port on at least one face of the housing connecting the manifold passage to the metering passage.

14. A multiple valve bank comprising in combination a plurality of interchangeable housings positioned together, each housing having a valve bore for receiving a shiftable valve member, a metering passage intersecting the valve bore and having an opening on at least one face of the housing, a manifold passage extending completely through the housing and having openings on opposite faces of the housing including the face of the housing having the metering passage opening, said manifold passage being on a different plane than the valve bore, the manifold passage of each housing joining with the manifold passages of immediately adjoining housings to form a continuous passage through the bank, and means in each housing connecting the metering passage thereof to the manifold passage of said housing.

15. A multiple valve bank comprising in combination a plurality of interchangeable housings positioned together, each housing having a valve bore for receiving a shiftable valve member, means forming a manifold passage in each housing on a different plane than the valve bore, each manifold passage extending completely through the housing to opposite faces thereof and joining with manifold passages on opposite sides thereof to form a continuous passage through the bank, a separate metering passage for each housing intersecting the valve bore, and means in each housing connecting the metering passage thereof to the manifold passage of said housing.

16. A multiple valve bank comprising in combination a plurality of interchangeable housings positioned together, each housing having a valve bore for receiving a shiftable valve member, a manifold passage on a different plane than the valve bore extending through the housing to opposite faces thereof, a metering passage intersecting the valve bore on opposite sides thereof and extending to at least one of the faces of the housing to which the manifold passage extends, and a recessed port on the face of the housing to which the metering passage extends for connecting said metering passage to the manifold passage of said housing, the manifold passage of each housing being joined to the manifold passages of immediately adjacent housings to form a continuous manifold passage through the bank.

DUNCAN B. GARDINER.
ROBERT A. ERSKINE.

REFERENCES CITED

The following references are of record in the file of this patent:

UNITED STATES PATENTS

| Number | Name | Date |
|---|---|---|
| 2,051,137 | Galleher | Aug. 18, 1936 |
| 2,247,140 | Twyman | June 24, 1941 |
| 2,247,141 | Twyman | June 24, 1941 |
| 2,445,781 | Hrdlicka | July 27, 1948 |
| 2,475,298 | Sloane | July 5, 1949 |
| 2,489,435 | Robinson | Nov. 29, 1949 |